United States Patent
Rowley et al.

(10) Patent No.: US 7,296,080 B2
(45) Date of Patent: Nov. 13, 2007

(54) METHOD OF SIMULATING NETWORK COMMUNICATIONS

(75) Inventors: Bevan S. Rowley, Lehi, UT (US); Stephen G. Huntington, Roy, UT (US)

(73) Assignee: McAfee, Inc., Santa Clara, CA (US)

( * ) Notice: Subject to any disclaimer, the term of this patent is extended or adjusted under 35 U.S.C. 154(b) by 1451 days.

(21) Appl. No.: 10/191,908

(22) Filed: Jul. 9, 2002

(65) Prior Publication Data

US 2003/0031181 A1 Feb. 13, 2003

Related U.S. Application Data

(60) Provisional application No. 60/306,107, filed on Jul. 17, 2001, provisional application No. 60/306,056, filed on Jul. 17, 2001, provisional application No. 60/306,106, filed on Jul. 17, 2001, provisional application No. 60/306,792, filed on Jul. 20, 2001.

(51) Int. Cl.
*G06F 15/16* (2006.01)

(52) U.S. Cl. ............... 709/231; 709/223; 709/224; 709/230; 370/389; 370/394

(58) Field of Classification Search ............... None
See application file for complete search history.

(56) References Cited

U.S. PATENT DOCUMENTS

| | | | |
|---|---|---|---|
| 4,792,753 A | 12/1988 | Iwai | 324/73 |
| 5,166,928 A | 11/1992 | Nishioka et al. | 370/421 |
| 5,442,639 A | 8/1995 | Crowder et al. | 371/20.1 |
| 5,586,264 A | 12/1996 | Belknap et al. | 725/115 |
| 5,760,767 A | 6/1998 | Shore et al. | 715/723 |
| 5,796,942 A | 8/1998 | Esbensen | 395/187.01 |
| 5,933,602 A | 8/1999 | Grover | 395/200.54 |
| 6,219,050 B1 | 4/2001 | Schaffer | 715/853 |
| 6,236,396 B1 | 5/2001 | Jenson et al. | 715/764 |
| 6,253,337 B1 | 6/2001 | Maloney et al. | 714/38 |
| 6,278,694 B1 | 8/2001 | Wolf et al. | 370/253 |

(Continued)

FOREIGN PATENT DOCUMENTS

WO 01/01726 A2 1/2001

OTHER PUBLICATIONS

Office Action Summary from U.S. Appl. No. 10/199,420 which was mailed on Oct. 5, 2005.

(Continued)

*Primary Examiner*—Yves Dalencourt
(74) *Attorney, Agent, or Firm*—Zilka-Kotab, PC; Christopher J. Hamaty

(57) ABSTRACT

A method for simulating network communication sessions is disclosed. A control engine sequences the packets using a protocol stack or by putting the packets into a sorted list. A simulation engine acquires the packets until a request packet or other initiation packet is received. The simulation engine feeds the request packet to a display engine that has the ability to treat the request packet as though the display engine itself originated the request (or initiation) packet. The simulation engine then sends the response packets relating to the request to the display engine, and the display engine uses those packets to simulate the display of the network communication session substantially in the form of the original communication.

27 Claims, 8 Drawing Sheets

U.S. PATENT DOCUMENTS

| | | | |
|---|---|---|---|
| 6,453,345 B2 | 9/2002 | Trcka et al. | 709/224 |
| 6,529,954 B1 | 3/2003 | Cookmeyer, II et al. | 709/224 |
| 6,593,942 B1 | 7/2003 | Bushmitch et al. | 715/721 |
| 6,597,694 B1 * | 7/2003 | Fondekar et al. | 370/389 |
| 6,708,292 B1 | 3/2004 | Mangasarian | 714/39 |
| 6,826,639 B2 | 11/2004 | Pasumansky et al. | 710/105 |
| 7,047,297 B2 | 5/2006 | Huntington et al. | 709/224 |
| 2001/0039579 A1 | 11/2001 | Trcka et al. | 709/224 |
| 2002/0173857 A1 | 11/2002 | Pabari et al. | 700/1 |
| 2003/0028662 A1 | 2/2003 | Rowley et al. | 709/231 |
| 2003/0131098 A1 | 7/2003 | Huntington et al. | 709/224 |
| 2003/0135525 A1 | 7/2003 | Huntington et al. | 707/501.1 |

OTHER PUBLICATIONS

Office Action Summary from U.S. Appl. No. 10/191,933 which was mailed on Oct. 11, 2005.

Office Action Summary from U.S. Appl. No. 10/199,168 which was mailed on Aug. 17, 2005.

Office Action Summary from U.S. Appl. No. 10/199,451 which was mailed on Jan. 30, 2006.

* cited by examiner

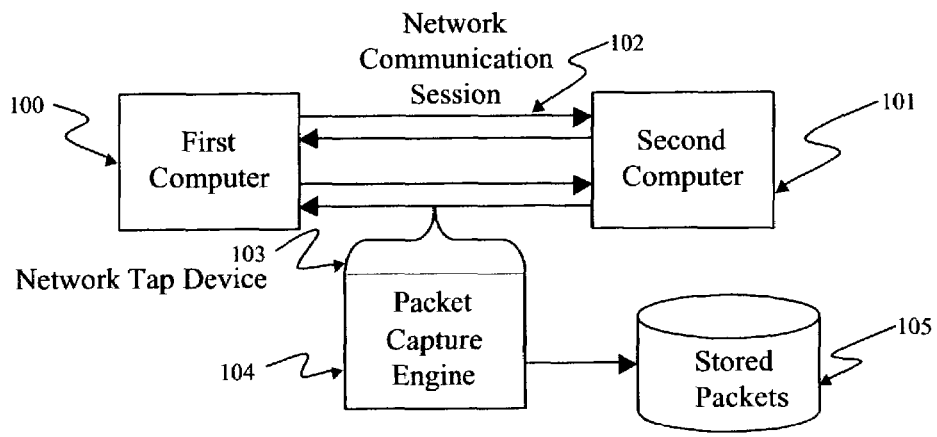
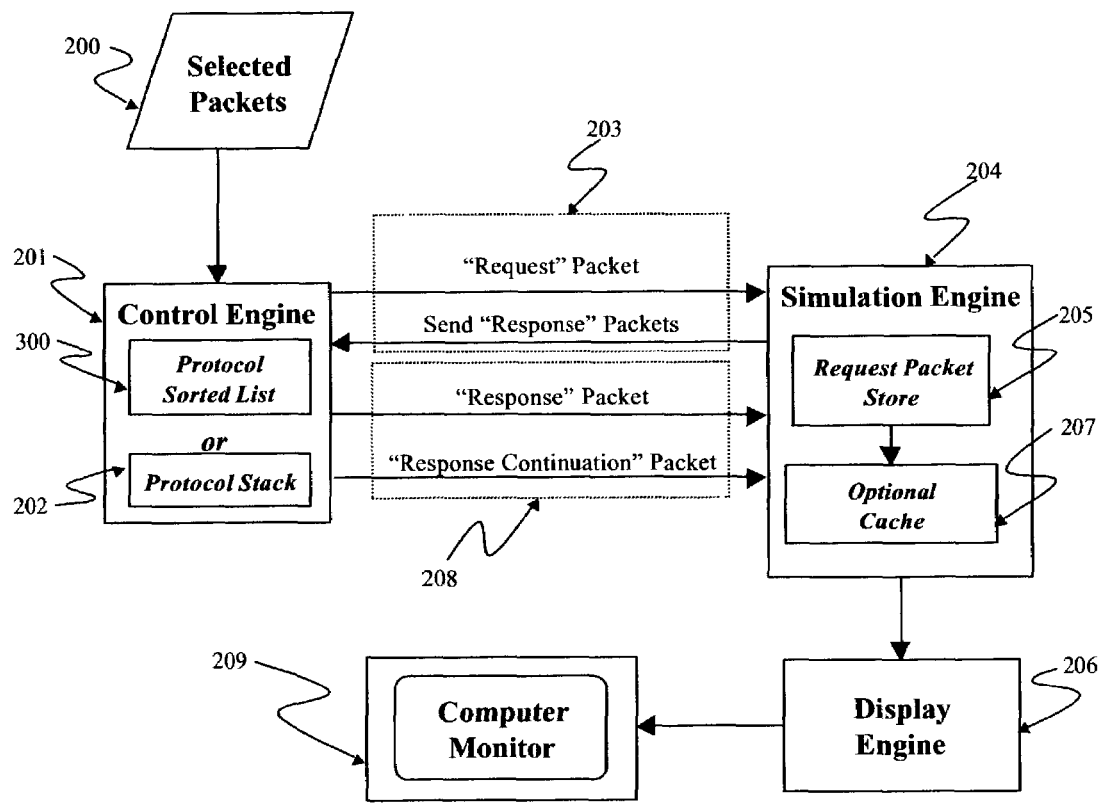
Figure 1
Figure 2

METHOD OF SIMULATING NETWORK COMMUNICATIONS

This application claims the benefit of U.S. Provisional Application No. 60/306,107 filed Jul. 17, 2001, the benefit of U.S. Provisional Application No. 60/306,056 filed Jul. 17, 2001, the benefit of U.S. Provisional Application No. 60/306,106 filed Jul. 17, 2001, and the benefit of U.S. Provisional Application No. 60/306,792 filed Jul. 20, 2001,

BACKGROUND OF THE INVENTION

This invention relates generally to processes for simulating network communications using captured network packets and, in particular, world wide web browsing sessions that use the TCP/IP communication protocol.

Computer networks have been a boon to information sharing in modern society. Computer users are able to access network resources for useful data and to communicate with other computer users. These networks include local area networks, company wide networks, and wide area networks including the vast world wide web.

Computer users access and exchange massive amounts of data with other users and with network servers and web servers, including email, instant messaging, text files, web pages, and a variety of binary objects such as audio and video. Networks and the worldwide web have developed tremendously over the last few years to provide constantly changing and updated information and even the ability to dynamically create and distribute web pages and other information from real-time data. While real-time changes and dynamic information provide many benefits, there is no ability to simulate networks communications as they occur or after the fact.

The ability to simulate a network communication from captured data is useful because it allows review of what actually occurred, or is occurring, during a network communication. Although the ability exists to download the content and structures of network files and web sites, there is no ability to recreate or simulate an actual communication session between a computer user and network sources, whether as it occurs or after the fact. Therefore a need has arisen to capture network communications as they occur, to store those communications, and to reconstruct and simulate the actual network communication as it takes place, or after the fact, with respect to identity of user, timing, and content.

SUMMARY OF THE INVENTION

According to the present invention, a method is provided that satisfies the need to simulate actual network communications. The method permits control of the display of the content of actual web sessions, the ability to control the display of web sessions, and recreation of files transported over a network. The method may be used to recreate and simulate both previously stored and real-time network communications.

The first step is to collect or capture the packets in transit over a network. This may be accomplished using known technology, such as a network packet capture device or sniffer. The packets may be stored on a storage medium, such as a hard drive, for analysis and use, and the packets may be used to simulate a network communication session as it occurs, or previously occurred, on the network.

Using a computer processor, a portion of the packets are selected, typically by selecting packets captured by the sniffer in a given time interval. The selected packets are then read sequentially from the storage, that is, a first packet is read and decoded. Packets are read and decoded until a request packet or other communications session initiation packet is found. A process for sorting the packets relating to the communication in question starts once an initiation packet or request packet is found.

The sorting or sequencing process may be performed in at least two different ways. First, the packets may be sorted onto a protocol sorted list. If the packet is either a request or a response, the packet is added to the protocol sorted list, preferably using the Transaction Control Protocol/Internet Protocol ("TCP/IP") address and port number of the computer sent or received the packet. The next packet is then read and decoded, and processed in the same way, until all of the selected packets have been processed.

Alternatively, the packets are sorted using a protocol stack, such as a TCP/IP stack. In this embodiment, if a given packet is in sequence, the packet is passed on to a display engine. If not, the packet is added to the protocol stack and held there until all the packets that are earlier in sequence have been passed to the display engine. At that point, the packet is sent from the protocol stack to the display engine.

The sequenced packets, having been passed to the display engine, are used by the display engine to recreate the network communication and display the communication on a computer monitor. This display may be merely a display of what the user saw in the communication, or a display of both the user's prior display and other control information. The control information may be derived from the network communication session to aid in navigation. Inclusion of control information permits a user to move back and forth through the network communication, if desired.

BRIEF DESCRIPTION OF THE DRAWINGS

Other features and advantages of the present invention will be apparent from the following Detailed Description taken in conjunction with the accompanying Drawings, in which:

FIG. 1 depicts a packet capture engine in operation;

FIG. 2 depicts an overview of the simulation method and apparatus according to the present invention;

DETAILED DESCRIPTION

Figure 3:
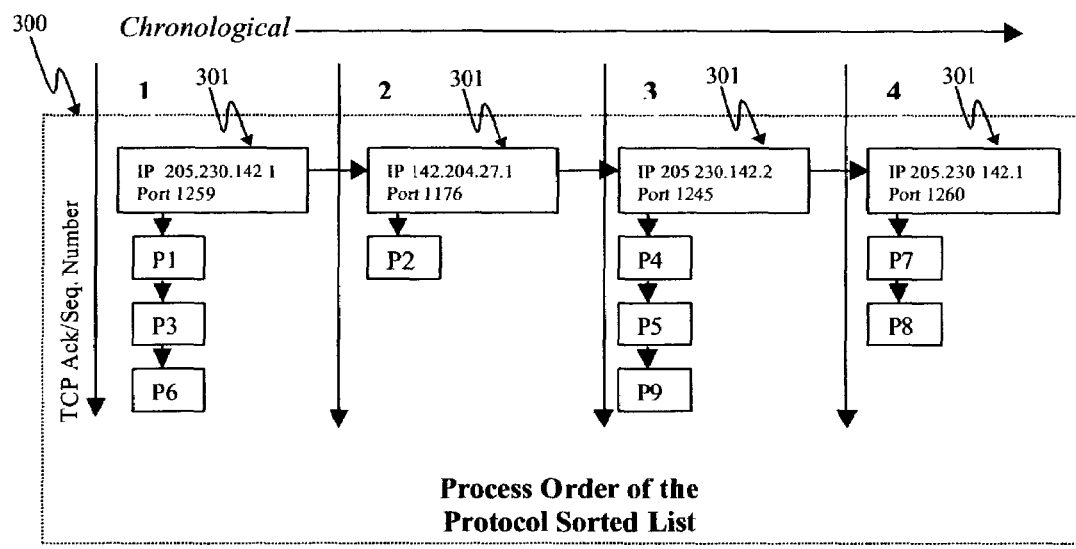
FIG. 3 depicts a protocol sorted list of packets.

According to the present invention, a method is provided that permits simulation and display of the content of actual web sessions and the ability to control the display of stored web sessions and other network communications. The method may be used to simulate and display both previously stored and real-time network communications. In effect, network communications may be captured and displayed as they appeared, or substantially as they appeared, in the original network communication session.

FIG. 1 depicts a network communication session 102 comprising multiple requests and responses between a first computer 100 and a second computer 101. Typically, network communications are conducted by transmitting packets of data across the network. The packets may contain data to be transmitted as well as addressing, sequence, and other process control information.

The first computer 100 sends a request to the second computer 101 by way of a packet or series of packets. A request packet is any packet that solicits a response, but also includes packets that initiate instant messaging, broadcast communications or other push technologies, or any other packet used to initiate a network communication. The second computer 101, which is typically a server computer, receives the packet or packets, decodes the request, and sends one or more response packets for the first computer to receive, decode, or process, as appropriate. The first or second computer may then send additional requests, thereby continuing the communication session, or the session may terminate.

To simulate the network communication session 102, the packets must first be captured as is known in the art. A network tap device 103, such as an Ethernet card set to promiscuous mode or a wireless network capture device, intercepts the packets being transmitted during the network session 102. A packet capture engine 104 is used to capture the raw data packets that are being communicated during the network communication session 102. If the network communication is to be reviewed at a later time, the captured packets may be stored on a storage medium 105. The process of capturing network packets is known in the art. Capture engines may be software, firmware, or hardware. Commonly available software capture engines include the Sniffer from Network Associates, the Lanalyzer from Novell, a Linux program called Ethereal and EtherPeek from WildPackets.

Typically, the packets are captured in a chronological fashion without regard to content or type. All or some portion of the captured packets may be selected for sorting and processing according to the method of the present invention. For instance, the portion may be selected by taking a block of packets captured during a specified time interval or by IP address or port number.

Figure 4:
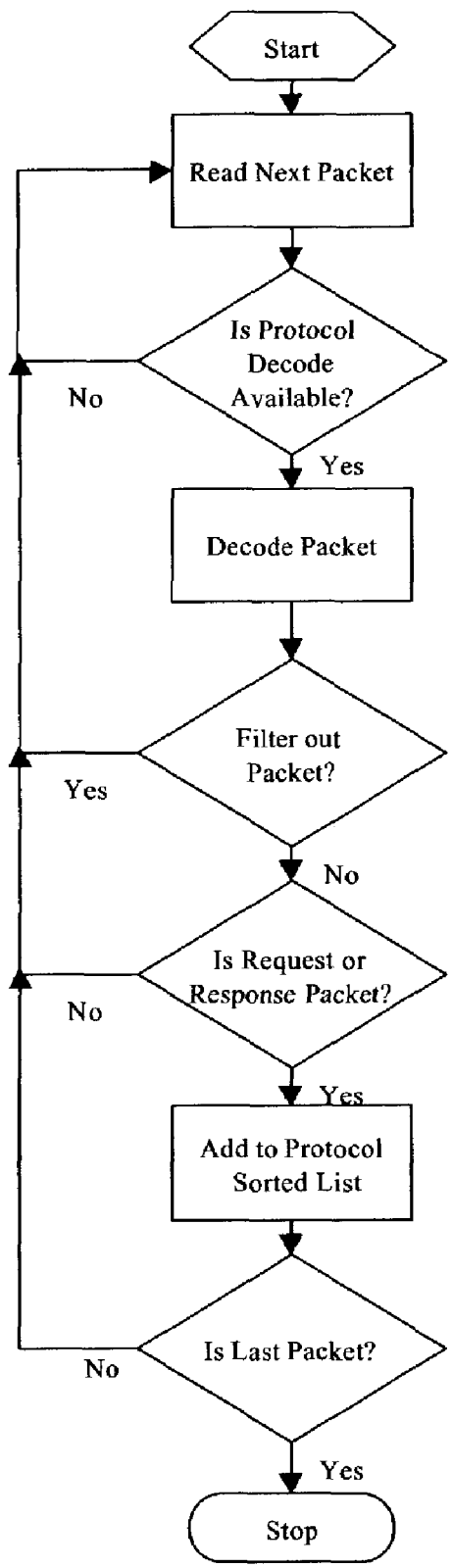
FIG. 4 depicts a flowchart of the process for sorting packets into a protocol sorted list according to one embodiment of the method of the present invention.

The selected packets 200 are then sorted or sequenced. As depicted in FIGS. 2, 3 and 4, according to one embodiment of the invention, a control engine 201 sorts the selected packets 200 into a protocol sorted list 300. The control engine 201 acquires selected packets 200 either from a live communication session or from the optional storage medium 105. The control engine decodes each of the selected packets 200 into its respective protocol. Typically, this will be a TCP/IP decode, as is known in the art.

FIG. 4 depicts a flow chart of the process for sorting the selected packets 200 into the protocol sorted list 300 as shown in FIG. 3, which depicts the protocol sorted list 300 including packets P1 through P9. A first packet P1 is read; if a decode for the protocol of the first packet P1 exists, the packet is decoded. If the first packet P1 is not needed for the subsequent simulation of the network communication session 102, the packet may not be included in the protocol sorted list 300. For example, a DNS (Domain Name Service) lookup request packet, an error packet, or corrupted packet may not be included.

The first packet P1 is then checked to determine if it is either a request or response type packet. If it is a request or response packet, the first packet P1 is added to the protocol sorted list 300 based on the IP address and port number (or other protocol indicia) of the first packet. The next packet P2 is then read, decoded, checked to determine if it is a request or a response packet, and added to the protocol sorted list 300 based on the IP address and port number of the packet P2.

In the same fashion, each of the selected packets 200 are sequentially read, decoded, checked and added to the protocol sorted list 300 until the last packet has been retrieved, read, decoded and added to the protocol sorted list. As depicted in FIG. 3, the protocol sorted list 300 groups the packets P1 through P9 from the selected packets 200 into a series of linked lists 301 based on the IP address and port number of the packets and in chronological order as the packets were received. Although it is presently contemplated that, in this embodiment, it is preferable to sort the packets by IP address and port number, the selected packets 200 may be sorted by other indicators, such as port only or IP address only, the MAC (Media Access Control) address from the network interface card, the UDP (User Datagram Protocol) port, or an IPX address. Furthermore, in addition to HTTP request/response packets, other request/response, local network protocols, or Internet protocols may be used. Examples of such other protocols include Novell's IPX/SPX protocol, the secure HTTPS protocol, and the File Transfer Protocol ("FTP").

Figure 5:
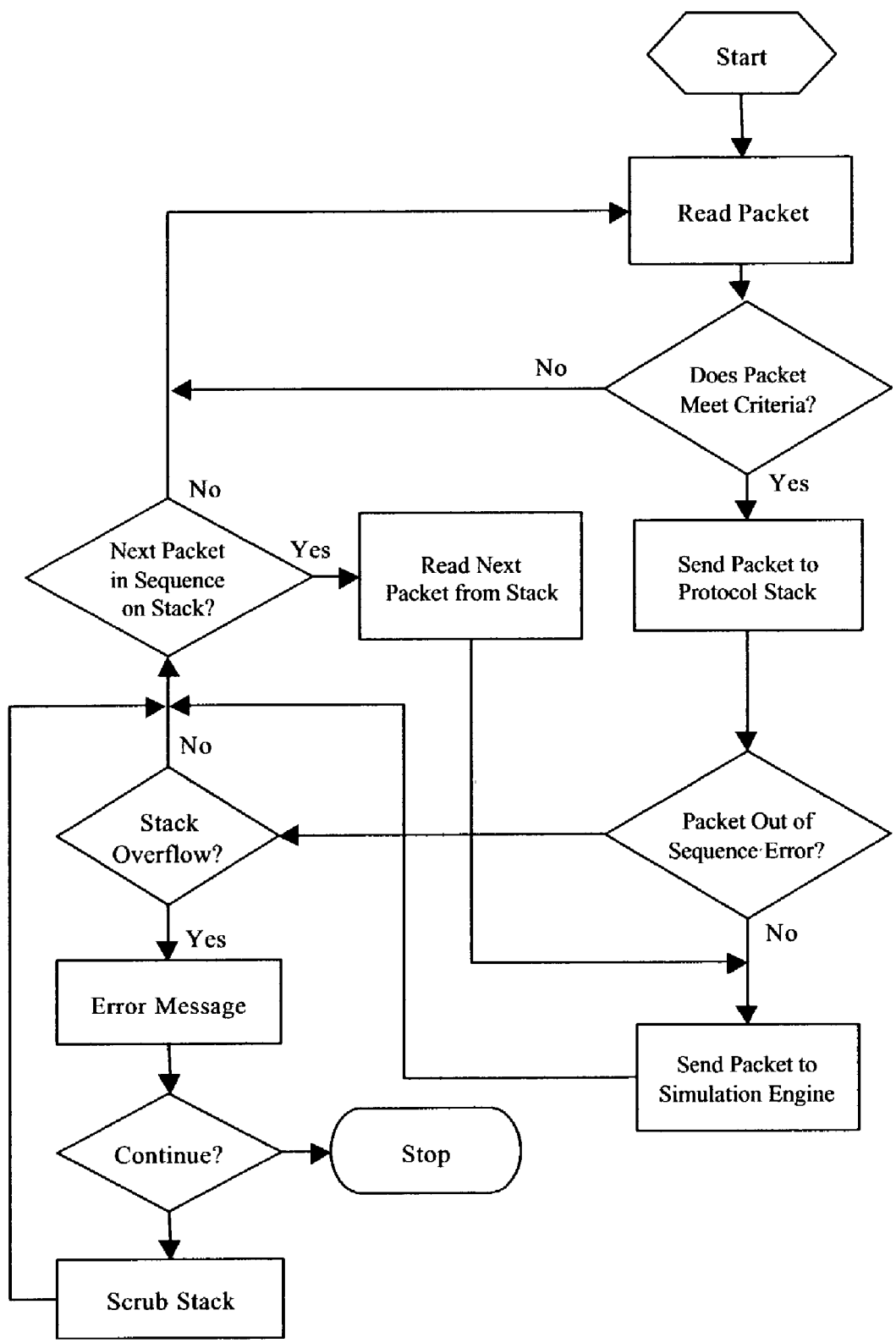
FIG. 5 depicts a flowchart of the process for using a protocol stack for sequencing packets according to a second embodiment of the method of the present invention.

According to another, preferred embodiment of the invention, rather than sort the selected packets 200 into a protocol sorted list 300, the packets are sequenced using a TCP/IP or other protocol stack 202. As depicted in the flow chart shown in FIG. 5, the control engine 201 acquires a first selected packet, either from a live communication or from the storage medium 105. The control engine determines whether the packet does not meet given criteria, such as whether the packet is corrupt, is not needed for simulation, is of zero length, or other such checks. If the packet satisfies the necessary criteria, the control engine reads the next packet.

If the given criteria are met, the control engine sends the packet 201 to the protocol stack 202. If the packet is in proper sequence, the control engine passes the packet on to a simulation engine 204 or buffers the packet for later transmission after a set of related packets have been buffered. The protocol stack 202 may buffer packets until all of a given set of packets have been sequenced. Thus, the protocol stack 202 may ensure that packet sets are sent to the simulation engine 204 in a complete and efficient manner.

If the packet is in sequence, the process continues by checking whether the next sequential packet is available on the protocol stack 202. If the packet is out of sequence, the control engine 201 checks to see if there is an overflow or other error on the stack 202. If not, the control engine 201 checks to determine whether the next packet in sequence is on the stack. If the next sequential packet is on the stack, the control engine 201 passes that packet on to the simulation engine 204. If the next packet in sequence is not on the stack, the next packet from the selected packets 200 is read and the process continues as described.

If there is an overflow or other stack error, the control engine produces an error message, and the option of continuing the process or terminating the process is provided. If the process is continued, either the protocol stack 202 is scrubbed to eliminate the minimum number of out of sequence packets or the out of sequence packets are passed to the simulation engine 204. The control engine 201 then checks to see if the next sequential packet is on the stack and continues as described above. As a result of these error checking and handling processes, each of the packets included in the selected packets 200 is sent to the simulation engine 204 in as close to the proper sequence as is feasible.

Although the sequenced packets may be stored for later analysis, it is preferable to perform the sequencing and the simulation in parallel. That is, while the packets are being placed in the proper sequence either by creating a protocol sorted list 300 or using a protocol stack 202, the simulation engine 204 simultaneously acquires the properly sequenced packets. Simultaneous processing increases the speed with which a simulation may be rendered.

Figure 6:
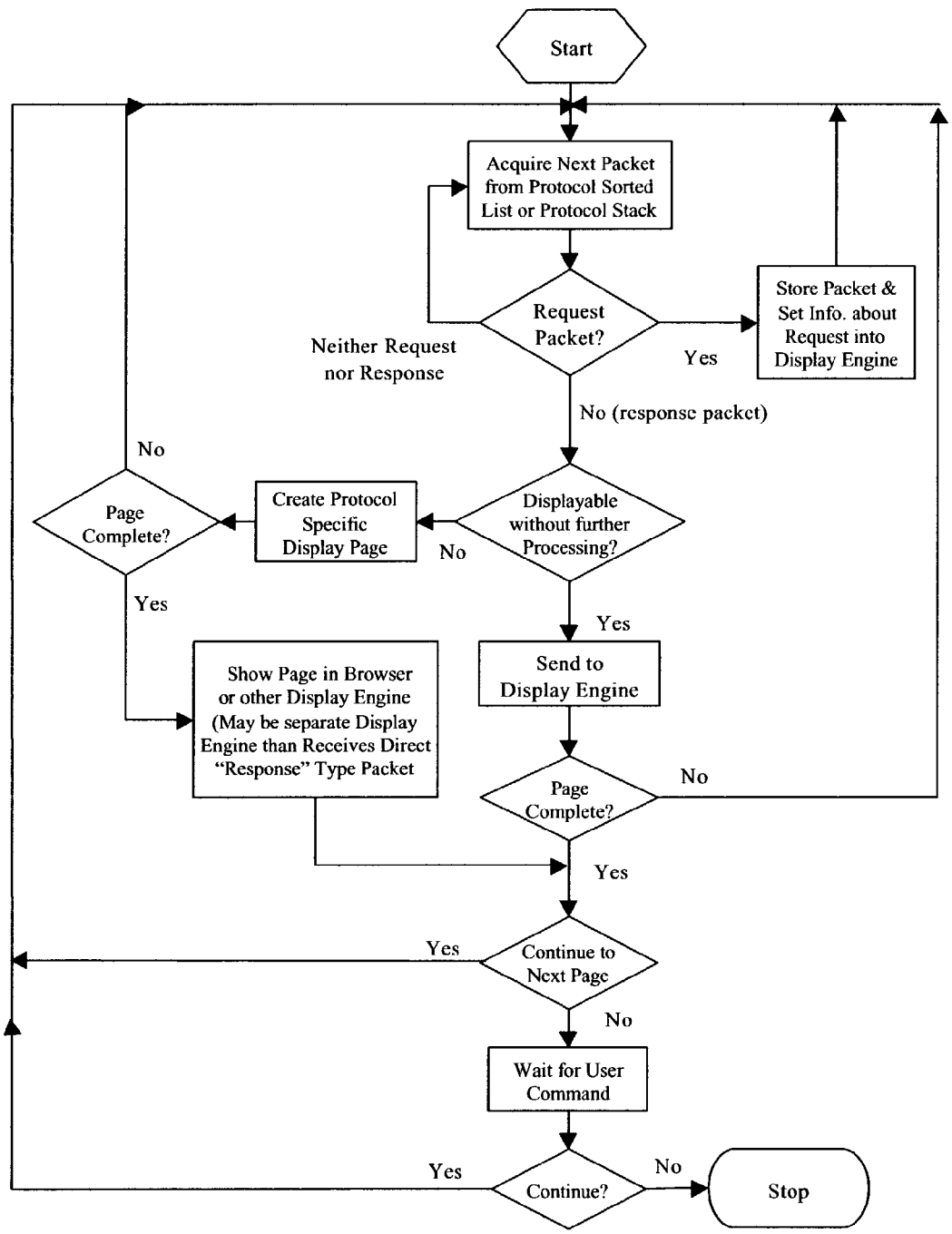
FIG. 6 depicts a flowchart of the process utilized by a simulation engine according to the method of the present invention.

As shown in FIGS. 2 and 6, the simulation engine 204 acquires packets from the control engine 201 until a first request packet 203 or other initiation packet is found. Those packets acquired before an initiation packet is found are not processed, as they must relate to a communication for which not all the packets are contained within the selected packets 200. The first request packet 203 (or other initiation packet) is stored in a request packet store 205 for use when processing response packets relating to that request packet.

The request packet 203, or information contained in the request packet, is also fed to a display engine 206. The request packet is used to cause the display engine to receive and process responses to the request as though the display engine had sent the request. The display engine 206 is preferably a web browser that has been modified to accept an external request packet and process that packet as if it had originated in the web browser.

The simulation engine 204 acquires the subsequent packets from the control engine 201. If the packets are neither request (or initiation) packets nor response packets, that is, if they are not necessary for simulating the network communication session 102, the packets are discarded or held pending processing of another network communication session. If the next packet acquired is another request packet, for example because there was no response to the first request, the next request packet is stored in the request packet store 205, and the process continues. Alternatively, request packets and associated response packets may be stored and displayed when all response packets to a given request have been received.

If, after storing a request packet in the request packet store 205, a response packet 208 is received, the simulation engine 204 determines whether the packet is of a type that can be interpreted by the display engine 206. If so, the packet is sent directly to the display engine 206, which interprets the packet as though it is being received as part of an ongoing network communication session (that is, one that was initiated by the display engine itself). The simulation engine 204 continues to acquire response packets until a displayable page is complete, and those packets have been sent to the display engine 206 for display.

If the response packet is not of a type that may be interpreted by the display engine 206, the simulation engine 204 may create a protocol specific display page. In doing so, as depicted in FIG. 6, the simulation engine 204 continues to acquire response packets and use those packets to build the protocol specific display page, until all of the packets needed for that page have been acquired and processed. At that point, the protocol specific display page is passed on to the display engine 206 or to some other display program or process. For some protocol specific display pages, a traditional web browser will not be able to render the page; in that case, the page may be sent to another display program or process that is capable of rendering the page.

As the simulation engine 204 processes packets, the file information from those packets is being sent to, or generated by, the display engine 206. Preferably, the display engine 206 includes a local caching capability and uses that local cache to store the file information as it is received. Typically, this will be the cache of the web browser or other display program. Alternatively, the simulation engine 204 may create its own cache 207 and store the file information in that cache, and the display engine 206 may be modified to use that cache 207 for displaying the page.

Figure 7:
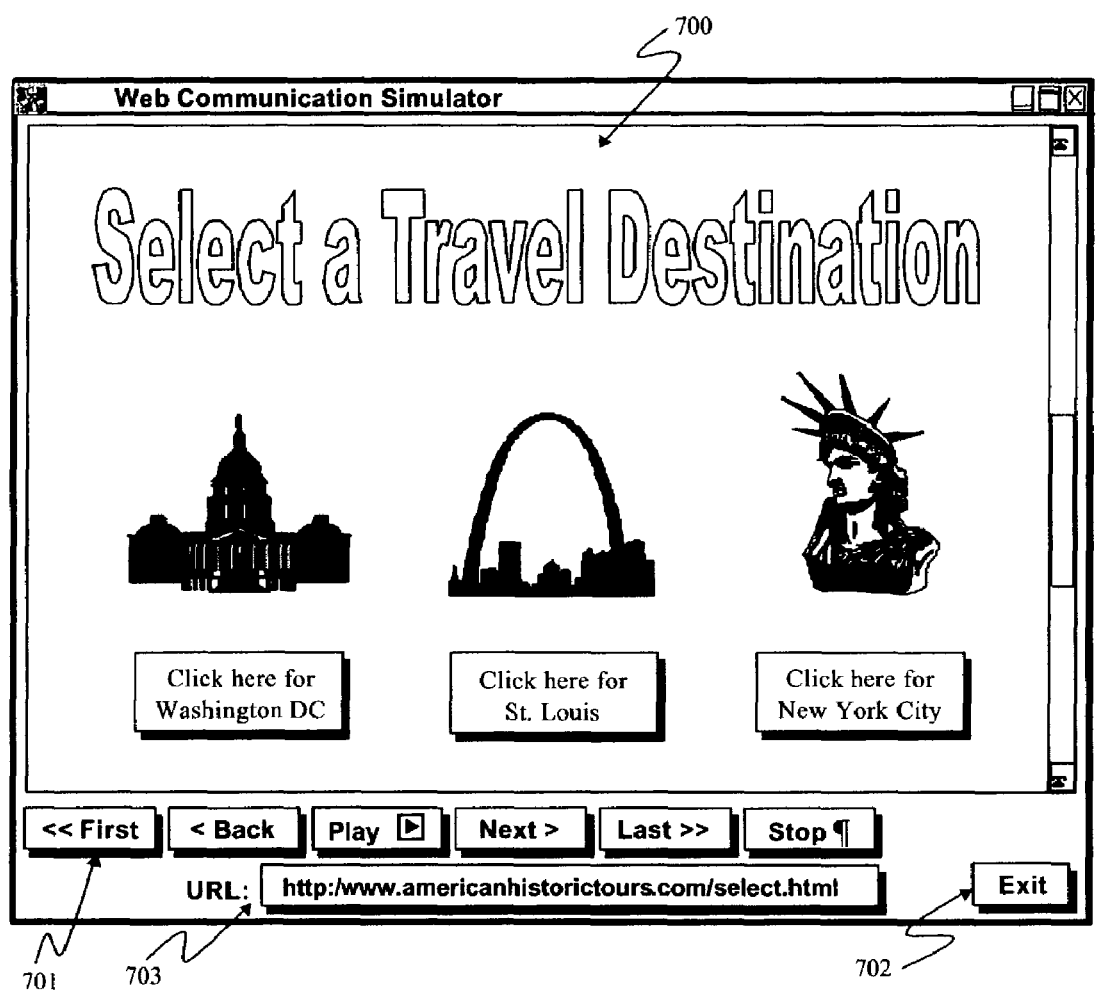
FIG. 7 depicts graphical representation of how a simulated network communication session may be displayed according to an alternate embodiment of the present invention.
Figure 8:
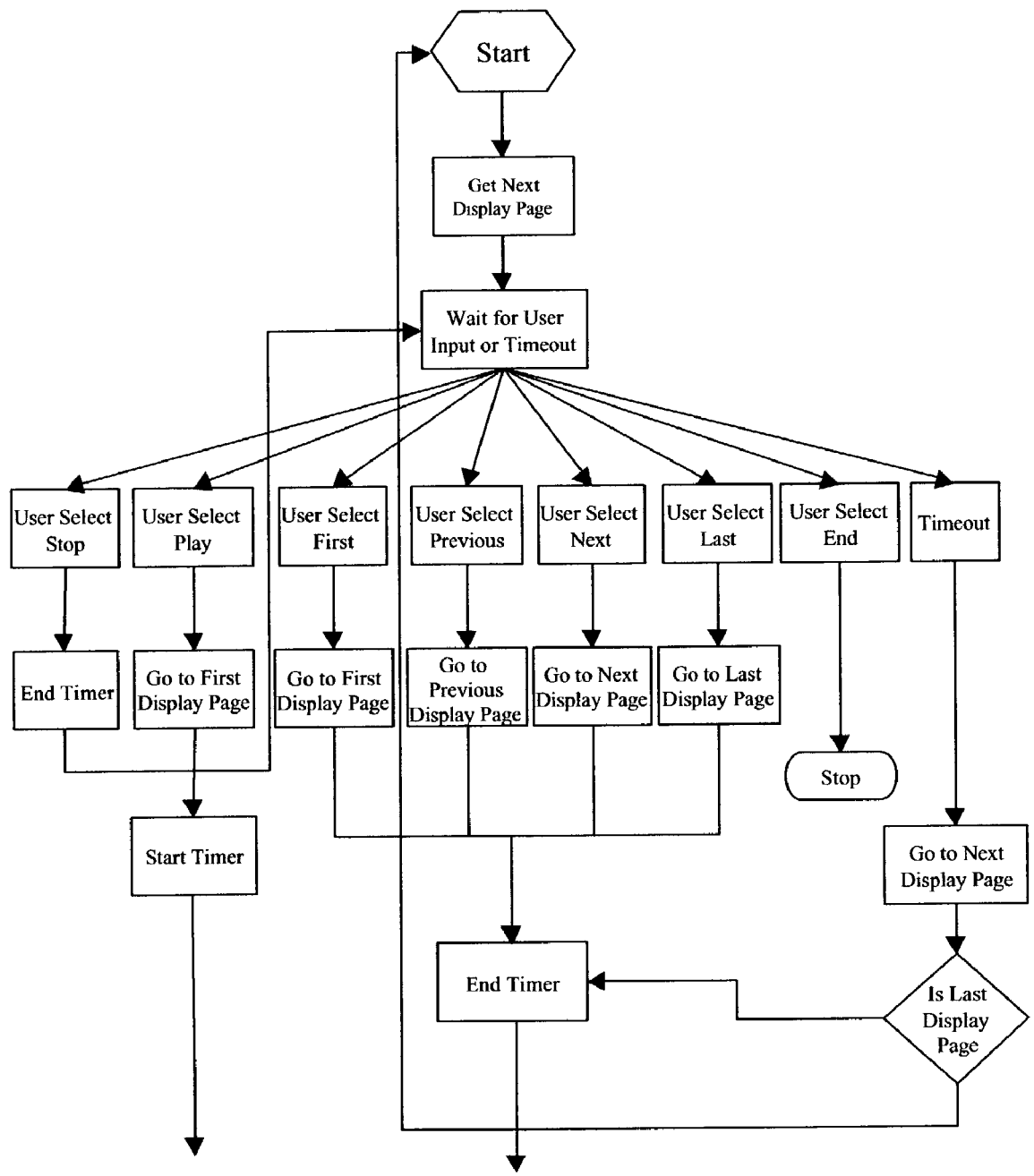
FIG. 8 depicts a flow chart of a display control system according to the method of the present invention.

Once a page has been completed, the page is displayed on a computer monitor 209. As depicted in FIG. 7, preferably the actual web page 700 (or other visualization) is displayed by the display engine 206. In one embodiment of the invention, the user is provided with a series of command buttons 701 to be used to control the display process. In this embodiment, and as depicted in FIG. 8, at any point during the display process, the user may select a command button 701 to control the display of the network communication session 102. For instance, the play command button 701 starts a timer and displays the web pages in a slide show format using pre-determined time intervals or the original viewer's time intervals as described below.

As further depicted in FIG. 7 and shown in the flow chart of FIG. 8, other command buttons 701 allow the user to display the next page, previous page, first page, last page, or to stop the display of the network communication session 102 in a manner analogous to the way a user controls a web browser during a live session. The exit command button 702 allows the user to terminate the simulated display. Other command buttons may be included to increase user control of the display simulation process. The URL display box 703 identifies the address of the web page being displayed.

Figure 9:
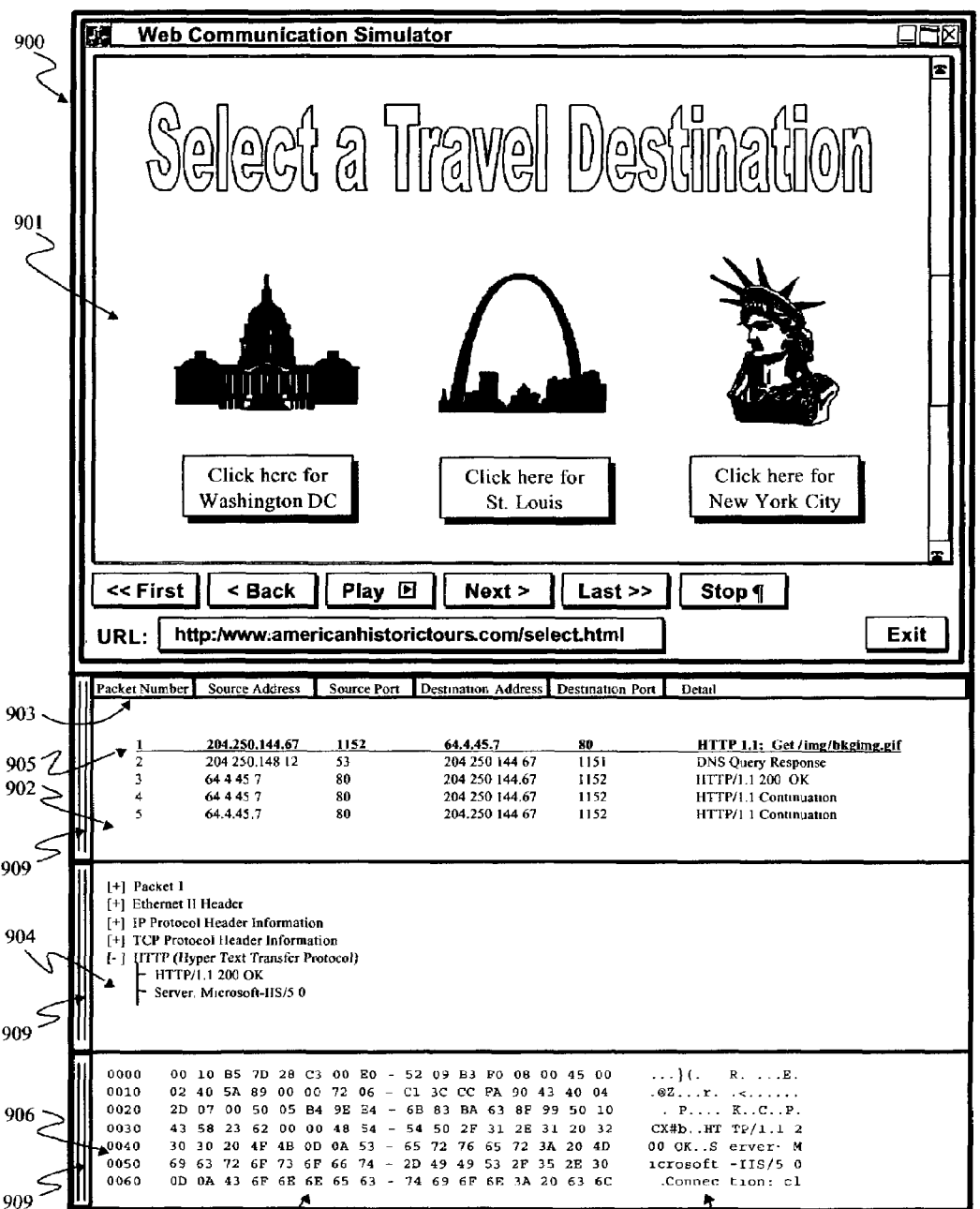
FIG. 9 depicts a graphical representation of how information about a simulated network communication may be displayed according to an alternate embodiment of the present invention.

FIG. 9 depicts an alternative method of how a network communication session 102 that has been simulated could be displayed within a web browser or other display program. A master display 900 is produced by the display engine 206 and includes display of various data relating to the selected packets 200 in the network communication session 102. As depicted in FIG. 9, the web page window 901 of the master display 900 is used to display a web page, as well as other data as described above. The web page window 901 is a scrollable area used to depict a full web page, if any, associated with the network communication session 102 being simulated. As an example, FIG. 9 depicts an HTTP network communication session 102.

Beneath the web page window 901 is a packet window 902, which is a one line description of one or more packets. A column bar 903 identifies the information being displayed in each packet, such as a serialized packet number, source address and port, destination address and port, and details concerning the nature and content of the packet. The column bar 903 may be configured by the user to add, delete, rearrange, or resize the various column descriptions.

FIG. 9 also depicts a packet decode window 904 that is used to present a complete decode of a selected packet 905. The user may select a [+] to expand the decode or a [−] to collapse the decode, as is typical in a hierarchical tree display. The user may also select information in any of the expanded limbs of the decode tree. When a user selects decoded information in the tree, the associated data is highlighted in a packet dump window 906 located beneath the packet decode window 904.

The packet dump window 906 allows the user to view the raw data associated with each packet. The packet dump window 906 displays a hexadecimal representation 907 of the data in a packet. A corresponding text representation 908 of the data is also displayed on the right side of the packet dump window 906.

When the user highlights a selected packet 905 in the packet window 902, the packet decode window 904 and packet dump window 906 are updated to display the relevant information relating to that packet 905. The user may also select information in the packet decode window 904 and the data contained in the selected packet will be highlighted within the packet dump window 906 in both the hexadecimal representation 907 and the corresponding text representation 908. As a result, a user may quickly navigate through the web pages, packets, and data captured from the packets of the network communication session 102. If a user views another web page, the master display 900 is updated by displaying the web page in the web page window 901, the first packet becomes the selected packet 905, and the other windows are updated accordingly.

As depicted in FIG. 9, each of packet window 902, packet decode window 904, and packet dump window 906 preferably have a dockable bar 909 on the left side. The dockable bar 909 allows a user to move, remove, and "dock" that is, connect, the respective windows to the master display 900. A user may also render the display area as an independent window by double clicking on the dockable bar 909.

As a network communication session 102 is being processed, visual representations of the session are displayed on the computer monitor 209. The display engine 206 or other display program may also process stream data such as video or audio, which may require additional software (such as a video display program) or hardware (such as a sound card, amplifier, and speakers). The browser or display program then awaits a response from the user, or until a user-determined timeout occurs.

If a timeout occurs before any user response is made, the simulation engine 204 continues to process the next page as described above. Once the last page included in the selected packets 200 has been displayed, the timer is stopped and the system will wait indefinitely for user input after displaying the last page. During a real-time simulation, selected packets 200 are constantly being provided to the control engine 201, and thus the simulation engine 204 continues processing until the user stops or exits the program. Real-time simulation allows a user to view the network communication session 102 virtually simultaneously with the live network communication session. The simulated pages or the underlying files may also be simultaneously stored to allow later review of the network communication session 102.

In another embodiment of the present invention, during the simulation process the display engine 206 reads the time stamps associated with each packet retrieved from the stored packets. By reading and decoding those time stamps, the time interval between packets, and thus the interval between files reconstructed from those packets, may be computed. This time differential information may then be used (instead of user defined commands or a time-out) automatically to advance the display from page to page in the same order and using the same timing as in the original network communication session. Typically, such a sequence would be initiated by use of a play command button 701.

In another embodiment of the invention, a cache server may be used to allow more complete simulation of the communication. A cache server is a computer, typically a separate and dedicated computer, that stores files and other information from prior network communication sessions for later retrieval. This is useful because certain files may not be part of a given network communication session because the user accessed those files from a local cache. A cache server may cumulatively store files from various communication sessions so that those files are available during a simulation in a manner similar to the way the user retrieves such files from a local cache.

It will be obvious to those of skill in the art that the method described may be modified to produce different embodiments of the present invention. Thus, the present invention has several advantages over the prior art without sacrificing the advantages of the prior art. Although different embodiments of the invention have been illustrated and described, various modifications and changes may be made by those skilled in the art without departing from the spirit and scope of the invention.

The invention claimed is:

1. A method for simulating network communications traffic comprising the steps of:
   capturing network packets by:
      attaching a network capture device to a network:
      using the network capture device to capture network packets as the network packets are passed across the network;
      storing the network packets on a mass storage device in chronological order;
   selecting a portion of the captured network packets based on a first predetermined set of criteria;
   sequencing the selected network packets using a predetermined process;
   simulating a network communication session by a process comprising the steps of:
      acquiring sequenced packets that are associated with the network communication session until a first request packet is detected;
      feeding the first request packet to a display engine;
      acquiring a next sequenced packet;
      if the next sequenced packet is a response packet produced in response to the first request packet, determining whether the next sequenced packet is of a type that may be interpreted by the display engine and either:
         if the next sequenced packet is of a type that may be interpreted by the display engine, sending the next sequenced packet to the display engine and acquiring additional response packets until all of the additional response packets responding to the first request packet have been sent to the display engine; or
         if the next sequenced packet is not of a type that may be interpreted by the display engine, initiating the creation of a visualization of the information in the next sequenced packet and acquiring additional response packets until all of the additional response packets responding to the first request packet have been incorporated into the visualization, and then sending the visualization to the display engine.

2. The method of claim 1 wherein the predetermined process comprises the steps of:
   (a) decoding a first packet from the selected packets;
   (b) if the first packet relates to a request or to a response, adding the packet to a sorted list corresponding to a second predetermined set of criteria that are satisfied by the packet; and (c) repeating steps (a) and (b) on additional captured packets until all packets relating to the first predetermined set of criteria have been sequenced.

3. The method of claim 1 wherein the predetermined process comprises the steps of:
reading a first selected packet;
determining whether the first selected packet meets a second predetermined set of criteria;
if the first selected packet meets the second predetermined set of criteria, determining whether the packet is out of sequence;
if the first selected packet is not out of sequence, sending the first selected packet to the simulation engine;
if the first selected packet is out of sequence, adding the packet to a temporary store;
repeating the steps of reading packets, determining whether the second set of criteria is met, and sending the packets to the simulation engine or adding out-of-sequence packets to the temporary store;
as packets in the temporary store fall into proper sequence, sending properly sequenced packets to the simulation engine; and
each time a packet is added to the temporary store, testing the temporary store for an overflow condition and, if overflow condition is detected, generating an error message.

4. The method of claim 1 further comprising the steps of:
acquiring additional request packets from the sequenced packets; and
repeating the steps of acquiring sequenced packets and sending the sequenced packets to the display engine until all of the packets responding to the additional request packets have been sent to the display engine.

5. The method of claim 1 further comprising the step of using the display engine to display a visual representation of at least a portion of the network communication on a computer monitor.

6. The method of claim 1 further comprising the step of using the display engine to display on a computer monitor at least one of:
a hexadecimal representation of the content of at least one packet;
a decode of at least one packet;
a listing of packets associated with the network communication;
a graphic representation of request and response packets associated with the network communication; and
a composite visual reconstruction of any text or graphic information contained in at least one packet.

7. The method of claim 5 further comprising the step of providing a user with a means of controlling the display of the network communication.

8. The method of claim 5 further comprising the step of permitting a user to control the display the network communication by selecting a command to implement at least one of the following operations:
playing display pages in chronological order;
playing display pages in chronological order using a predetermined timing sequence;
stopping the playing of display pages;
going to a next display page;
going to a previous display page;
going to a first display page;
going to a last display page; or
going to a user-selected display page.

9. The method of claim 1 wherein the first predetermined set of criteria includes the address of at least one computer connected to the network.

10. The method of claim 1 wherein the first predetermined set of criteria includes specifying a predetermined time interval.

11. A method for simulating network communications traffic comprising the steps of:
sequencing selected packets from a network communication using a predetermined process;
simulating a network communication session by a process comprising the steps of:
acquiring sequenced packets that are associated with the network communication session until a first request packet is detected;
feeding the first request packet to a display engine;
acquiring a next sequenced packet;
if the next sequenced packet is a response packet produced in response to the first request packet, determining whether the next sequenced packet is of a type that may be interpreted by the display engine and either:
if the next sequenced packet is of a type that may be interpreted by the display engine, sending the next sequenced packet to the display engine and acquiring additional response packets until all of the additional response packets responding to the first request packet have been sent to the display engine; or
if the next sequenced packet is not of a type that may be interpreted by the display engine, initiating the creation of a visualization of the information in the next sequenced packet and acquiring additional response packets until all of the additional response packets responding to the first request packet have been incorporated into the visualization, and then sending the visualization to the display engine;
wherein the predetermined process comprises the steps of:
reading a first selected packet;
determining whether the first selected packet meets a second predetermined set of criteria;
if the first selected packet meets the second predetermined set of criteria, determining whether the first selected packet is out of sequence;
if the first selected packet is not out of sequence, sending the first selected packet to the simulation engine;
if the first selected packet is out of sequence, adding the first selected packet to a temporary store;
repeating the steps of reading packets, determining whether the second predetermined set of criteria is met, and sending the packets to the simulation engine or adding out-of-sequence packets to the temporary store;
as the out-of-sequence packets in the temporary store fall into proper sequence, sending properly sequenced packets to the simulation engine; and
each time an out-of-sequence packet is added to the temporary store testing the temporary store for an overflow condition and, if the overflow condition is detected, generating an error message.

12. The method of claim 11 further comprising the steps of:
attaching a network capture device to a network;

using the network capture device to capture network packets as the network packets are passed across the network;

storing the captured network packets on a mass storage device in chronological order; and selecting a portion of the captured network packets based on a first predetermined set of criteria.

13. The method of claim 12 wherein the predetermined process comprises the steps of:

(a) decoding a first packet from the selected portion of the captured network packets;

(b) if the first packet relates to a request or to a response, adding the first packet to a sorted list corresponding to the second predetermined set of criteria that are satisfied by the first packet; and (c) repeating steps (a) and (b) on additional captured packets until all the captured network packets relating to the first predetermined set of criteria have been sequenced.

14. The method of claim 11 further comprising the steps of:

acquiring additional request packets from the sequenced packets; and repeating the steps of acquiring sequenced packets and sending the sequenced packets to the display engine until all of the sequenced packets responding to the additional request packets have been sent to the display engine.

15. The method of claim 11 further comprising the step of using the display engine to display a visual representation of at least a portion of the network communication on a computer monitor.

16. The method of claim 11 further comprising the step of using the display engine to display on a computer monitor at least one of:

a hexadecimal representation of the content of at least one packet;

a decode of at least one packet;

a listing of packets associated with the network communication;

a graphic representation of request and response packets associated with the network communication; and a composite visual reconstruction of any text or graphic information contained in at least one packet.

17. The method of claim 15 further comprising the step of providing a user with a means of controlling the display of the network communication.

18. The method of claim 15 further comprising the step of permitting a user to control the display the network communication by selecting a command to implement at least one of the following operations:

playing display pages in chronological order;

playing display pages in order using a predetermined timing sequence;

stopping the playing of display pages;

going to a next display page;

going to a previous display page;

going to a first display page;

going to a last display page; or going to a user-selected display page.

19. A method for simulating network communications traffic comprising the steps of:

acquiring sequenced packets that are associated with a network communication;

feeding a first request packet to a display engine;

acquiring a next sequenced packet;

if the next sequenced packet is a response packet produced in response to the first request packet, either:

if the next sequenced packet is of a type that may be interpreted by the display engine, sending the next sequenced packet to the display engine; or if the next sequenced packet is not of a type that may be interpreted by the display engine, creating a visualization of the information in the next sequenced packet and sending the visualization to the display engines;

sequencing selected packets from the network communication using a predetermined process;

wherein the predetermined process comprises the steps of:

reading a first selected packet;

determining whether the first selected packet meets a second predetermined set of criteria;

if the first selected packet meets the second predetermined set of criteria, determining whether the first selected packet is out of sequence;

if the first selected packet is not out of sequence, sending the first selected packet to the simulation engine;

if the first selected packet is out of sequence, adding the first selected packet to a temporary store;

repeating the steps of reading the selected packets, determining whether the second captured network set of criteria is met, and sending the selected packets to the simulation engine or adding out-of-sequence packets to the temporary store;

as the out-of-sequence packets in the temporary store fall into proper sequence, sending properly sequenced packets to the simulation engine; and each time an out-of-sequence packet is added to the temporary store, testing the temporary store for an overflow condition and, if the overflow condition is detected, generating an error message.

20. The method of claim 19 further comprising the step of acquiring additional response packets until all of the additional response packets responding to the first request packet have been acquired and sent to the display engine.

21. The method of claim 19 further comprising the steps of:

attaching a network capture device to a network;

using the network capture device to capture network packets as the network packets are passed across the network;

storing the captured network packets on a mass storage device in chronological order; and selecting a portion of the captured network packets based on a first predetermined set of criteria.

22. The method of claim 19 wherein the predetermined process comprises the steps of:

(a) decoding a first packet from the selected packets;

(b) if the first packet relates to a request or to a response, adding the first packet to a sorted list corresponding to the second predetermined set of criteria that are satisfied by the first packet; and (c) repeating steps (a) and (b) on additional captured packets until all of the additional captured packets relating to a first predetermined set of criteria have been sequenced.

23. The method of claim 19 further comprising the steps of:

acquiring additional request packets from the sequenced packets; and repeating the steps of acquiring the sequenced packets and sending the sequenced packets to the display engine until all of the response packets responding to the additional request packets have been sent to the display engine.

24. The method of claim 19 further comprising the step of using the display engine to display a visual representation of at least a portion of the network communication on a computer monitor.

25. The method of claim 19 further comprising the step of using the display to display on a computer monitor at least one of:
   a hexadecimal representation of the content of at least one packet;
   a decode of at least one packet;
   a listing of packets associated with the network communication;
   a graphic representation of request and response packets associated with the network communication; and
   a composite visual reconstruction of any text or graphic information contained in at least one packet.

26. The method of claim 24 further comprising the step of providing a user with a means of controlling the display of the network communication.

27. The method of claim 24 further compromising the step of permitting a user to control the display the network communication by selecting a command to implement at least one of the following operations:
   playing display pages in chronological order;
   playing display pages in chronological order using a predetermined timing sequence;
   stopping the playing of display pages;
   going to a next display page;
   going to a previous display page;
   going to a first display page;
   going to a last display page; or
   going to a user-selected display page.

* * * * *

UNITED STATES PATENT AND TRADEMARK OFFICE
CERTIFICATE OF CORRECTION

PATENT NO. : 7,296,080 B2
APPLICATION NO. : 10/191908
DATED : November 13, 2007
INVENTOR(S) : Rowley et al.

Page 1 of 1

It is certified that error appears in the above-identified patent and that said Letters Patent is hereby corrected as shown below:

In the claims:

Claim 3, col. 9, line 24 insert --the-- before "overflow" and after "if";

Claim 11, col. 10, line 60 replace "store testing" with --store, testing--;

Claim 18, col. 11, line 53 insert --chronological-- before "order" and after "in";

Claim 19, col. 12, line 10 replace "engines;" with --engine;--;

Claim 25, col. 13, line 9 insert --engine-- before "to" and after "display";

Claim 27, col. 14, line 4 replace "compromising" with --comprising--.

Signed and Sealed this
Fifteenth Day of February, 2011

David J. Kappos
*Director of the United States Patent and Trademark Office*